UNITED STATES PATENT OFFICE.

ALBRECHT SCHMIDT AND ADOLF STEINDORFF, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

STABLE INDIGO-WHITE PREPARATIONS AND PROCESS OF MAKING SAME.

1,054,039. Specification of Letters Patent. Patented Feb. 25, 1913.

No Drawing. Application filed June 6, 1912. Serial No. 702,126.

*To all whom it may concern:*

Be it known that we, ALBRECHT SCHMIDT, Ph. D., chemist, and ADOLF STEINDORFF, Ph. D., chemist, citizens of the Empire of Germany, residing at Höchst-on-the-Main, Germany, have invented certain new and useful Improvements in Stable Indigo-White Preparations and Processes of Making Same, of which the following is a specification.

In U. S. Patent No. 906,307 is described a process of manufacturing stable concentrated indigo-white or indigo-white salt preparations, particularly suitable for the cold fermentation-vat, which comprises mixing indigo-white or an alkali salt of indigo-white with molasses, syrup, saccharine substances or their technical equivalents, and then, if necessary, concentrating or completely drying them by evaporation.

We have found that, instead of the above-mentioned bodies, lactic acid preparations (under which term we comprise lactic acid, lactates, and the hereafter-mentioned substances containing lactic acid) may be advantageously incorporated with the indigo-white or with its salts (both comprised under the term indigo-white preparations).

The present process constitutes a technical improvement on that described in the above mentioned U. S. patent, in that when employing lactic acid or lactates, both of which yield aqueous syrupy solutions losing water with difficulty, it is possible to use even smaller quantities than when using the bodies mentioned in said U. S. patent, which are soluble in water, of a syrupy consistency, of neutral reaction and capable of fermenting by themselves. The lactic acid and the lactates do not ferment, therefore it is not necessary to employ so highly concentrated solutions of said bodies as is the case with carbohydrate solutions.

Example I: 50 kg. of indigo-white, in the form of a press-cake obtained by strong pressure, are kneaded with 80 kilos of lactic acid of 50% strength, and, if necessary, concentrated by evaporation *in vacuo*. The preparation of indigo-white thus obtained, containing 30% of indigo, forms a thin, syrupy liquid which can easily be made into a paste with water; even when allowed to stand for a prolonged time, it does not show any traces of fermentation or moldiness.

Example II: 25 kilos of indigo-white in the form of a 20% paste is mixed while stirring with 10 kg. of lactic acid of 50 per cent. strength and 28 kilos of caustic soda lye of 40° Bé. specific gravity, and the mass is evaporated to dryness *in vacuo*. When dry, the product becomes friable and spongy; it readily dissolves in water and yields a brown vat. The stability of the preparation so obtained is excellent.

In the place of the lactates there may of course be employed technical preparations containing lactic acid, such as, for instance, the reaction-products containing lactates produced by the action of alkaline hydrates or carbonates, or alkaline-earth hydrates (these three substances being comprised under the term "alkaline agents"), upon glucose or other sugar substances or by reduction of indigo by means of glucose and an alkali hydrate. When using such substances, the indigo may be reduced by means of glucose and an alkali hydrate at a temperature which must not be too high and in a solution which must not be too concentrated, and then the solution is evaporated to dryness in a vacuum.

The new preparations are gray to brown bodies, soluble in dilute alkalis, being precipitated from these solutions by means of dilute acids, and showing on the one hand the known reactions of the indigo-white and on the other hand those of the lactic acid.

Having now described our invention what we claim is:

1. The process of manufacturing stable concentrated preparations of indigo-white, particularly suitable for the fermentation-vat, which consists in incorporating lactic acid preparations with preparations of indigo-white.

2. The process of manufacturing stable concentrated preparations of indigo-white, particularly suitable for the fermentation-vat, which consists in incorporating alkaline lactic-acid preparations with preparations of indigo-white and evaporating them to dryness in a vacuum.

3. The process of manufacturing stable concentrated preparations of indigo-white, particularly suitable for the fermentation-vat, which consists in incorporating preparations containing lactic acid, formed by the action of alkaline agents upon saccharine substances, with preparations of indigo-white, and evaporating said preparations to dryness.

4. As new products, the herein described stable concentrated preparations of indigo-white particularly suitable for the fermentation-vat, being gray to brown bodies, soluble in dilute alkalis, being precipitated from these solutions by means of dilute acids, and showing on the one hand the known reactions of the indigo-white and on the other hand those of the lactic acid.

In testimony whereof, we affix our signatures in presence of two witnesses.

ALBRECHT SCHMIDT.
ADOLF STEINDORFF.

Witnesses:
JEAN GRUND,
CARL GRUND.